May 15, 1923.
P. SECCAMANI
DISTANCE OPERATED CUTTING PLIERS
Filed July 7, 1920   2 Sheets-Sheet 2
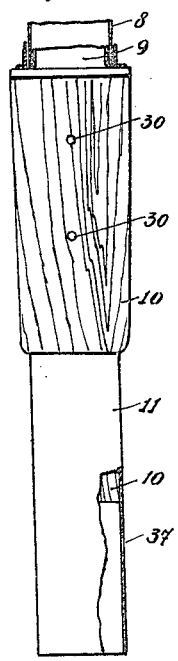
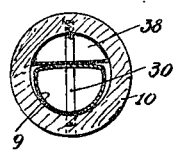
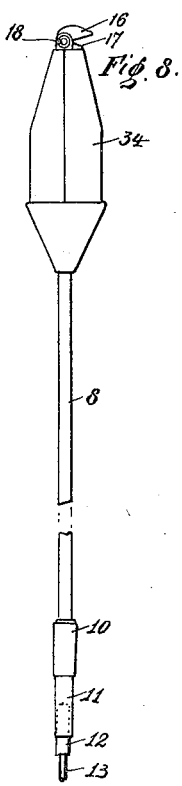
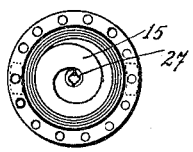
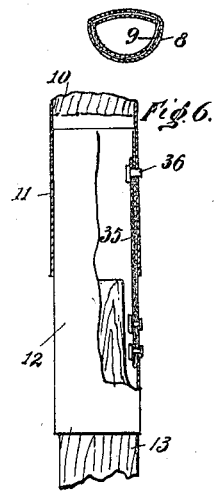
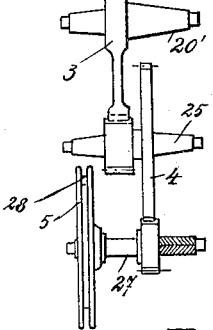
Inventor
P. Seccamani
by
H. R. Kerslake
Atty.

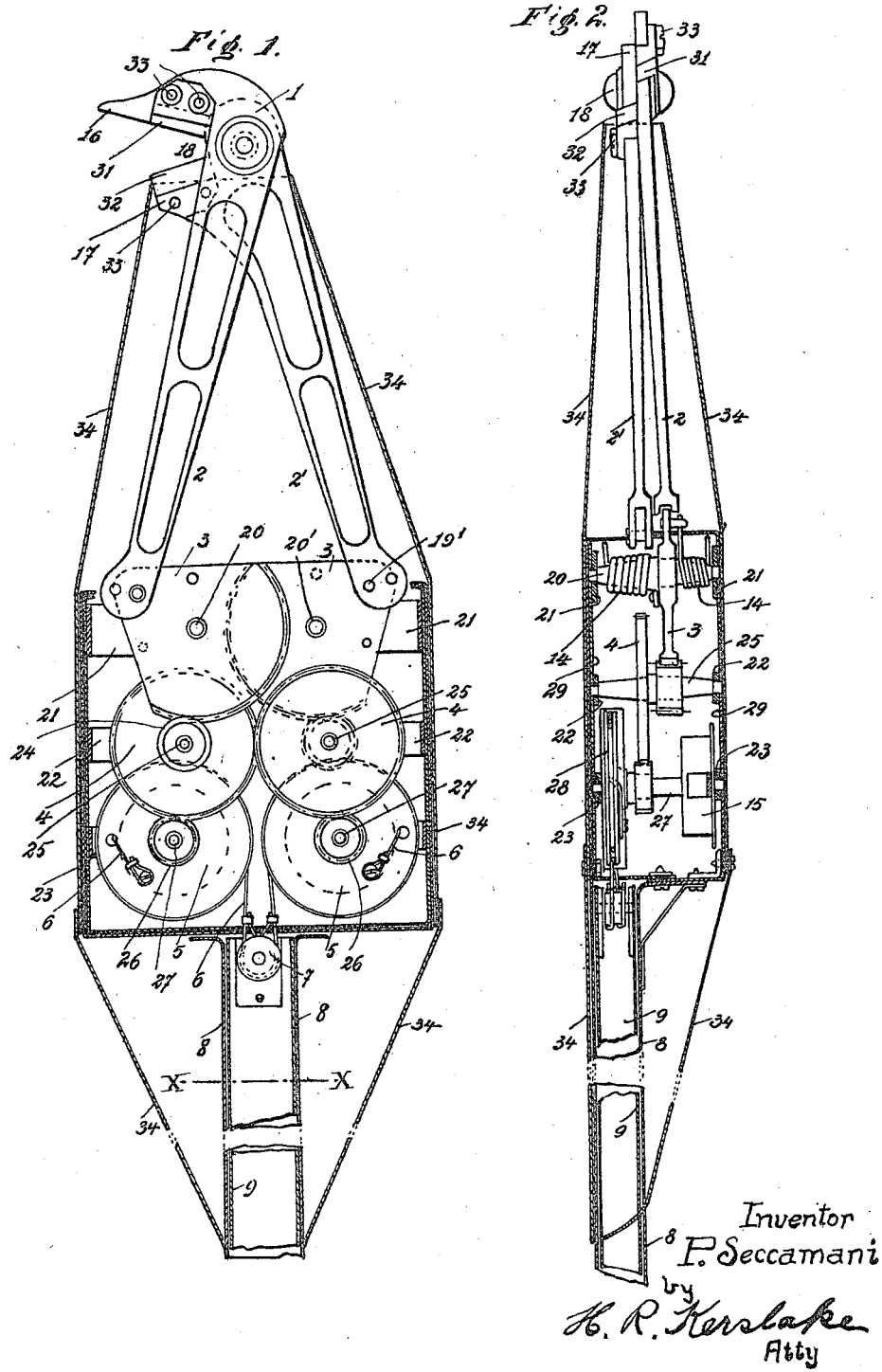

Patented May 15, 1923.

1,455,671

UNITED STATES PATENT OFFICE.

PIETRO SECCAMANI, OF BRESCIA, ITALY.

DISTANCE-OPERATED CUTTING PLIERS.

Application filed July 7, 1920. Serial No. 394,537.

(GRANTED UNDER THE PROVISIONS OF THE ACT OF MARCH 3, 1921, 41 STAT. L., 1313.)

*To all whom it may concern:*

Be it known that I, PIETRO SECCAMANI, gentleman, a subject of the King of Italy, and resident of 36 Via Trieste, Brescia, Italy, have invented certain new and useful Improvements in Distance-Operated Cutting Pliers (for which I have applied for patent in Italy, application date June 27, 1916, date of grant August 10, 1916, No. 154890 Reg. Gen.), of which the following is a specification.

Object of the invention is the provision of a cutting plier for cutting wires which can be operated at a distance by means of simple pull action and which due to its special arrangement of parts can also be employed for cutting metal cords.

The annexed drawing shows only by way of example an embodiment of the invention in which, Fig. 1 is a front view the casing and the box being removed.

Fig. 2 is a side view, the casing and the box being removed and in section on line A—B of Fig. 1.

Figs. 3, 4, 5 and 6 show some details.

Fig. 7 is a section on the line X—X of Fig. 1.

Fig. 8 is a general view in greatly reduced scale.

Fig. 9 is another detail.

Fig. 10 shows the left portion of the device in respect to the line A—B of Fig. 1.

The head 1 of the plier is provided with two jaws 16 and 17 each integral with one of the arms 2, 2' pivoted together at 18. The free ends of these arms are pivoted at 19, 19' each on one of the two circular sectors 3, 3' which in turn are pivoted at 20, 20' on the opposite cross-pieces 21.

The circular portion of each sector meshes with a pinion 24 pivoted at 25 and integral with a gear 4 which in its turn engages a pinion 26 pivoted at 27 and integral with a pulley 5 having a deep groove 28. The pivots 25 and 27 are fitted respectively on the cross-pieces 22 and 23.

The cross-pieces 21, 22 and 23 are fixed on the inside of a box 29 which is open at the front to allow the passage and the movement of the arms 2, 2'.

On each pulley 5 is fixed to one end a metallic cord 6, 6 which is wound on the pulley itself. The other end of each cord issues from the inside of the box at the rear portion of it through a suitable hole and is fixed in any suitable manner to a tube 9 having a D shaped section and which can slide within another tube 8 (Fig. 7) of like section.

With the object in view of keeping the cord taut of the pivots of pulleys 5 springs 15 (Figs. 2 and 9) are provided.

The tube 8, having the tube 9 therein, is fixed at one end to the rear portion of the box 29.

The tube 9, to which are fixed the ends of the cords 6, 6 extends beyond the free end of the tube 8 and is fixed inside a handle 10 of insulating material (Figs. 3 and 4) by means of screws 30.

In order to better fix the tube 9 in the handle 10, which latter is of cylindrical form, a filling core 38 (Fig. 3) is provided and is fastened by the same screws 30 which fix the tube 9.

At the free end of the handle 10 is fixed a sleeve 11 into which another sleeve 12 can be inserted (Fig. 5) which is integral with an extension stem 13.

The two sleeves 11 and 12, which slide one on the other may be connected by a plate spring 35 (Fig. 6) one end of which is fixed at the interior of the sleeve 12 whilst the other end carries a pin 36 which passes through a hole in the wall of the sleeve 12 and through the hole 37 (Figs. 4 to 6) in the wall of the sleeve 11.

The whole of the apparatus, excepting the head 1, is enclosed in a casing having nearly ovoidal shape (Fig. 8) which from the lower jaw, extends to a point of the tube 8 situated at a short distance apart from the rear face of the box 29.

The cutting members 31, 32 respectively of the jaws 16, 17 are mounted on the jaws in such a manner as to be easily replaced and are fastened thereto by the screws 33.

The operation of the apparatus is as follows:

When a wire, or a cord, is to be cut, specially if situated at a distance, or in case the cutting must be carried out quickly, the apparatus is thrown over the said wire or cord while holding the stem 13 grasped, and as soon as the wire or cord is struck, the apparatus is drawn towards the operator, which can also be done in darkness. The casing, sliding over the wire or cord, by reason of its ovoidal shape, will cause the wire or cord to fall between the open jaws 16 and 17, and the wire or cord then meeting the upper jaw will act as stop for the plier. Then by further exerting a drawing towards the operator, the following will take place:

The handle 10 will drag with it the tube 9 sliding in tube 8 fixed to the box 29, which cannot be displaced as it is engaged by the wire or cord to be cut.

The tube 9, by sliding, draws the metallic cords 6 fixed to it, causing the pulleys 5, 5 on which said cords are wound, to rotate.

The pulleys, by means of the pinions 26, cause the gears 4 to rotate and the latter by means of the pinions 25 cause the sectors 3, 3′ to rotate. By their displacement, the sectors cause the arms 2, 2′ to approach and consequently to close the jaws 16 and 17 and so effect the cut. This being effected as the plier has no more a point of support, the sectors under the action of the spiral springs 14, 14 return to their initial position of rest and bring back all the mechanism to initial position.

The springs 15 assist the movement for rewinding the cords 6, 6 on the pulleys 5, 5, dragging the apparatus with the tube 8 along the inside tube 9 so that it is brought again to the initial position of rest.

Such an apparatus finds its special application for cutting high voltage electric wires.

Having now particularly described and ascertained the nature of the said invention and in what manner the same is to be performed I declare that what I claim is:—

1. In a tool of the character described, a casing having an exteriorly tapered open end, a pair of arms located in said casing and pivoted together independently of said casing, a pair of laterally projecting cutting jaws carried by said arms located exteriorly of the tapered open end of the casing, the tapering exterior of the casing acting to guide a wire into the space between said jaws for cutting action whereby the tool may be operated at a point distant from said wire, and actuating means for said jaws arranged in said casing and supporting said jaws in position therein.

2. In a tool of the character described, a casing having an exteriorly tapered open end, a pair of arms located in said casing and pivoted together independently of said casing, a pair of laterally projecting jaws carried by said arms located exteriorly of the tapered open end of the casing, the outermost jaw extending a distance beyond the plane of the tapered end of the casing and constituting a stop for engagement with a wire whereby to limit the movement of the casing relative thereto and to permit the tool to be operated at a point distant from said wire, the tapering exterior of the casing acting to guide a wire into the space between said jaws for cutting action, and actuating means for said jaws arranged in said casing and supporting said jaws in position.

3. In a tool of the character described, a pair of pivotally connected jaw carrying arms, a casing, a pair of members mounted for turning movement in the casing, means pivotally connecting each pair with one of said members at a point eccentric to the pivotal axis of said member, a train of gears associated with each member, and means associated with the last gear of each train for actuating the latter to oscillate the jaw carrying arms.

4. In a tool of the character described, a pair of pivotally connected jaw carrying arms, a casing, a pair of members mounted for turning movement in the said casing, means pivotally connecting the jaw carrying arms with said members at points eccentric to the pivotal axes of the latter, a train of gears associated with each member of the pair, actuating means associated with the last gear of each train to actuate the latter to oscillate the jaw carrying arms, and a handle carried by said casing and receiving the last mentioned means.

5. In a tool of the character described, a casing, a pair of pivotally connected jaw carrying arms, rotatable members received in said casing and pivotally connected with the respective jaw carrying arms at points eccentric to the pivotal axes of the rotatable members, a flexible actuating element, means connecting the flexible actuating element with the rotatable members whereby to actuate the latter, a hollow handle carried by the casing, and a slidable member received in said handle and connected with the flexible element to actuate the latter.

6. In a tool of the character described, a pair of pivotally connected jaw carrying arms, rotatable members, a casing receiving said members and pivotally connected with the latter at points eccentric to the pivotal axes thereof, a tapered hollow extension carried by the casing receiving the jaw carrying extremities of the arms for guiding an object into the space between the jaws, a flexible actuating element, means connecting the actuating element with the rotatable members, a hollow handle carried by the casing, and a slidable member received in said handle and connected with the flexible actuating element for controlling the latter.

Signed at Milan, Italy, this 11th day of June 1920.

PIETRO SECCAMANI.